(12) United States Patent
Kawaguchi

(10) Patent No.: US 10,609,229 B2
(45) Date of Patent: Mar. 31, 2020

(54) DISPLAY PROCESSING DEVICE, IMAGE FORMING APPARATUS, DISPLAY PROCESSING METHOD, AND RECORDING MEDIUM

(71) Applicant: Kyocera Document Solutions Inc., Osaka (JP)

(72) Inventor: Shinichi Kawaguchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/408,472

(22) Filed: May 10, 2019

(65) Prior Publication Data

US 2019/0349491 A1    Nov. 14, 2019

(30) Foreign Application Priority Data

May 14, 2018    (JP) .................................. 2018-093099

(51) Int. Cl.
*H04N 1/00*    (2006.01)
*G06F 3/0485*    (2013.01)
*G06F 3/0484*    (2013.01)
*G06F 3/0488*    (2013.01)
*G06F 3/041*    (2006.01)

(52) U.S. Cl.
CPC ....... *H04N 1/00411* (2013.01); *G06F 3/0412* (2013.01); *G06F 3/0416* (2013.01); *G06F 3/0488* (2013.01); *G06F 3/04845* (2013.01); *H04N 1/0044* (2013.01)

(58) Field of Classification Search
CPC .............. H04N 1/00411; H04N 1/0044; G06F 3/0412; G06F 3/0416; G06F 3/04845; G06F 3/0488
See application file for complete search history.

(56) References Cited

U.S. PATENT DOCUMENTS

2014/0215365 A1*    7/2014    Hiraga ................. G06F 3/04883
                                                                        715/765
2016/0065763 A1*    3/2016    Kawaguchi ........ H04N 1/00469
                                                                        358/1.2

FOREIGN PATENT DOCUMENTS

JP    2016-053810 A    4/2016

* cited by examiner

*Primary Examiner* — Quang N Vo
(74) *Attorney, Agent, or Firm* — James Judge

(57) ABSTRACT

A display processing device includes a display, a touch sensor, and a control unit. The display displays a first preview image corresponding to a printing result of a character string image including a plurality of characters. The control unit executes a first detecting process, a rotation angle obtaining process, a second detecting process, and a magnification rate calculation process upon receiving the signal indicative of the touched position. The first detecting process indicates a process that detects a first character image with the touched position as an origin. The rotation angle obtaining process indicates a process that obtains a rotation angle at which a direction of the first character image becomes a predetermined direction. The second detecting process indicates a process that detects a heading character image indicating a heading character of the plurality of characters. The magnification rate calculation process indicates a process that calculates a magnification rate.

10 Claims, 13 Drawing Sheets

DISPLAY PROCESSING DEVICE, IMAGE FORMING APPARATUS, DISPLAY PROCESSING METHOD, AND RECORDING MEDIUM

INCORPORATION BY REFERENCE

This application is based upon, and claims the benefit of priority from, corresponding Japanese Patent Application No. 2018-093099 filed in the Japan Patent Office on May 14, 2018, the entire contents of which are incorporated herein by reference.

BACKGROUND

Unless otherwise indicated herein, the description in this section is not prior art to the claims in this application and is not admitted to be prior art by inclusion in this section.

There is proposed a display processing device that displays a preview image. For details, the above-described display processing device includes a display and a control unit. The display displays the preview image. When a user touches a display surface of the display, the control unit determines an enlargement ratio corresponding to a touched position touched by the user. The control unit displays an enlarged preview image enlarged at the determined enlargement ratio on the display.

SUMMARY

A display processing device according to one aspect of the disclosure includes a display, a touch sensor, and a control unit. The display displays a first preview image corresponding to a printing result of a character string image including a plurality of characters. The touch sensor outputs a signal indicative of a touched position touched by a user on the first preview image. The control unit receives the signal indicative of the touched position. The control unit executes a first detecting process, a rotation angle obtaining process, a second detecting process, and a magnification rate calculation process upon receiving the signal indicative of the touched position. The first detecting process indicates a process that detects a first character image with the touched position as an origin. The first character image indicates a character image detected first when the first preview image is analyzed with the touched position as the origin. The rotation angle obtaining process indicates a process that obtains a rotation angle at which a direction of the first character image becomes a predetermined direction when the first character image is displayed on the display. The second detecting process indicates a process that detects a heading character image indicating a heading character of the plurality of characters with the first character image as an origin. The magnification rate calculation process indicates a process that calculates a magnification rate at which a display size that indicates a size when the heading character image is displayed on the display becomes a specified size. The control unit displays the second preview image on the display. The second preview image indicates the first preview image enlarged at the magnification rate and rotated at the rotation angle.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
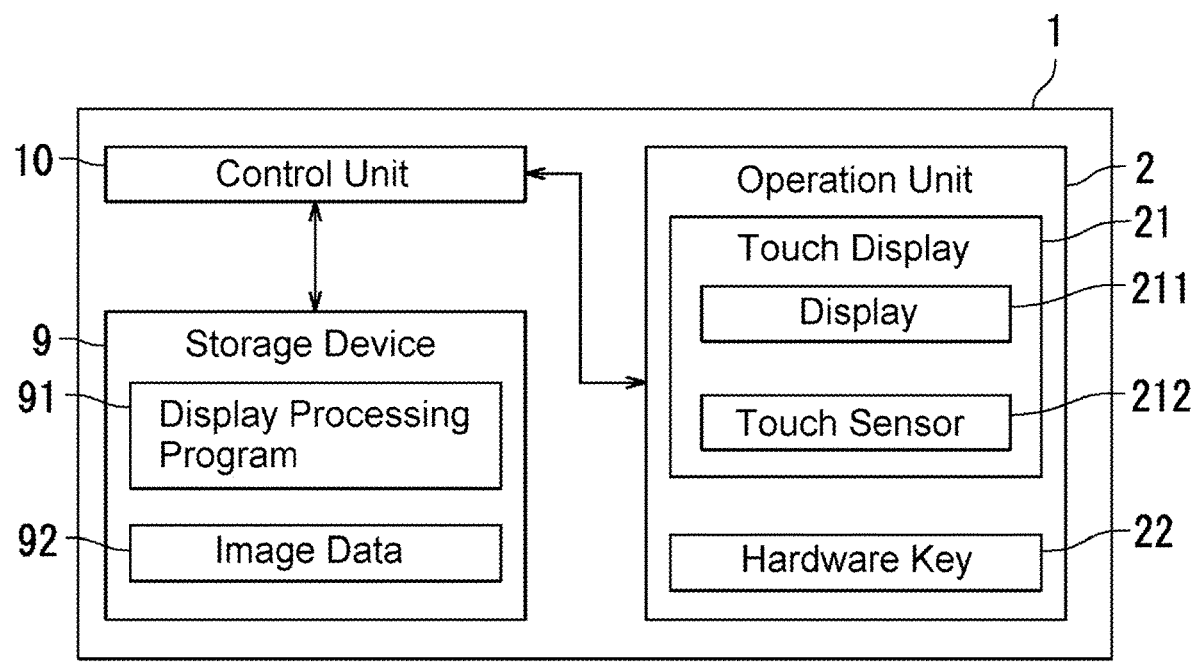
FIG. 1 illustrates a block diagram illustrating a configuration of a display processing device according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of a display processing device, an image forming apparatus, a display processing method, and a display processing program according to the disclosure with reference to the drawings. In the drawings, identical reference numerals are used to the identical or corresponding parts not to repeat explanations.

Embodiment 1

First, with reference to FIG. 1, a configuration of a display processing device 1 according to Embodiment 1 of the disclosure will be described. FIG. 1 illustrates a block diagram illustrating a configuration of the display processing device 1 according to Embodiment 1.

As illustrated in FIG. 1, the display processing device 1 includes an operation unit 2, a storage device 9, and a control unit 10.

The operation unit 2 accepts an instruction to the display processing device 1 from a user. The operation unit 2 transmits a signal indicative of the instruction from the user to the control unit 10 upon accepting the instruction from the user.

The operation unit 2 includes a touch display 21 and a hardware key 22. The touch display 21 includes a display 211 and a touch sensor 212.

The display 211 displays various kinds of screens. The display 211 is, for example, a liquid crystal display or Organic Electro Luminescence Display.

The touch sensor 212 detects a touch by a detection object. The touch sensor 212 outputs a signal indicative of a position where the touch by the detection object is detected. The output signal is transmitted to the control unit 10. The following describes the position where the touch by the detection object is detected as "touched position." The detection object is, for example, a finger of a user. The touch sensor 212 is, for example, a resistance film method touch sensor or a capacitive type method touch sensor.

The storage device 9 stores various kinds of data. The storage device 9 is configured of a storage device and a semiconductor memory. The storage device is configured of, for example, a Hard Disk Drive (HDD) and/or Solid State Drive (SSD). The semiconductor memory configures, for example, a Random Access Memory (RAM) and Read Only Memory (ROM). In this embodiment, the storage device 9 stores a display processing program 91 and image data 92.

The control unit 10 is configured of a processor such as a Central Processing Unit (CPU). The control unit 10 includes an integrated circuit for image formation process. The integrated circuit for image formation process is configured of, for example, an Application Specific Integrated Circuit (ASIC). The control unit 10 controls operations of respective units of the display processing device 1 by executing the display processing program 91 stored in the storage device 9.

In this embodiment, the user selects the image data 92 the preview image of which is to be displayed from the image data 92 stored in the storage device 9 via the operation unit 2. The preview image is an image that is displayed on the display 211 by a preview function, and is an image displayed by estimating a printing result of the image data 92. The user inputs an instruction to display the preview image corresponding to the image data 92 to the operation unit 2 after selecting the image data 92 the preview image of which is to be displayed. The operation unit 2 transmits an instruction signal indicative of the instruction to display the preview image corresponding to the selected image data 92 to the control unit 10 upon accepting the instruction to display the preview image corresponding to the selected image data 92.

The control unit 10 executes a preview image displaying process upon receiving the instruction signal. For details, the control unit 10 displays the preview image corresponding to the selected image data 92 on the display 211. The following describes the preview image displayed on the display 211 by the control unit 10 receiving the instruction signal as "first preview image."

Figure 2:
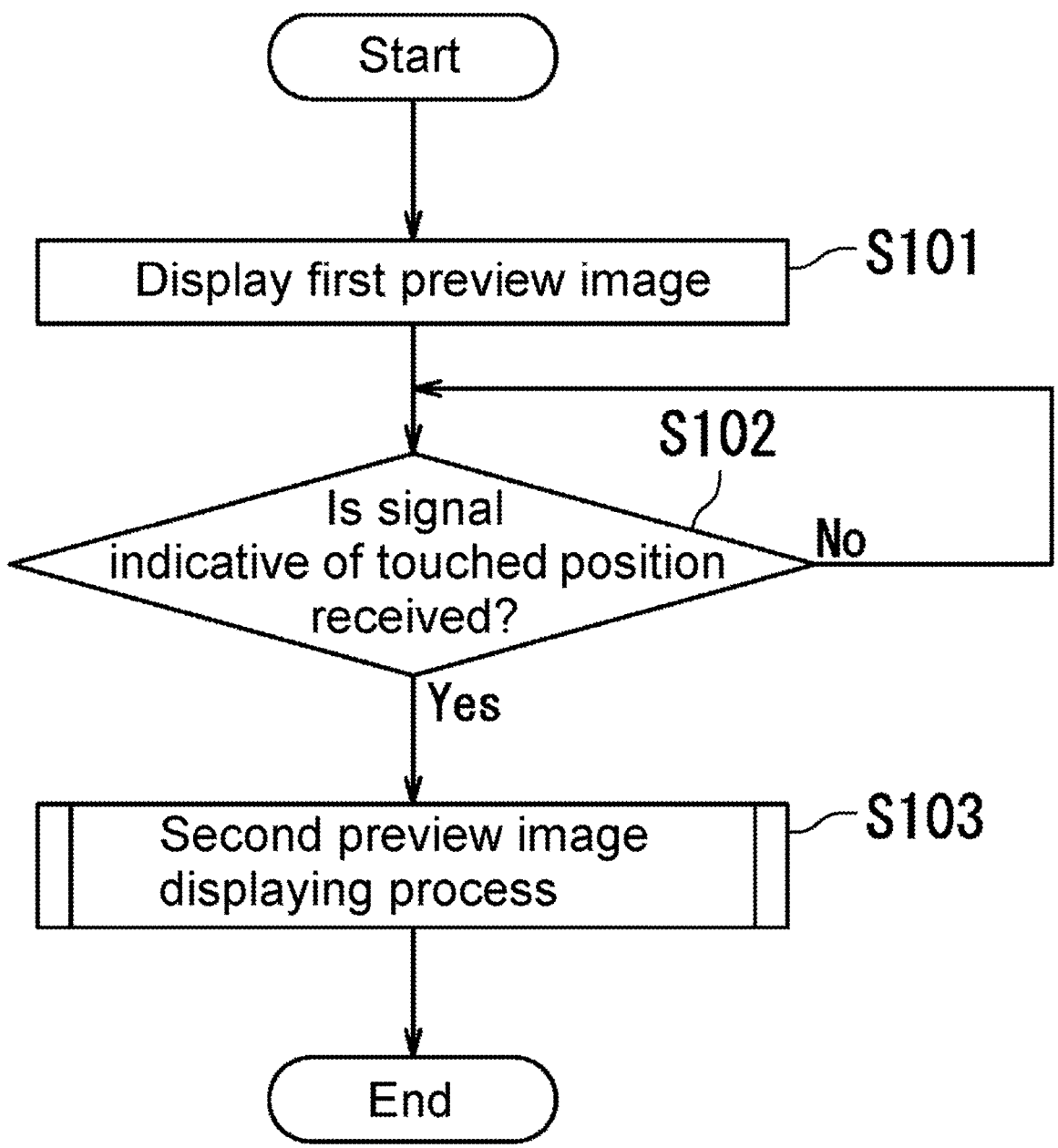
FIG. 2 illustrates a preview image displaying process according to Embodiment 1.

Next, with reference to FIGS. 1 and 2, the preview image displaying process according to Embodiment 1 will be described. FIG. 2 is a flowchart illustrating the preview image displaying process according to Embodiment 1. The preview image displaying process is started when the control unit 10 receives the instruction signal.

As illustrated in FIG. 2, the control unit 10 displays the first preview image that corresponds to the selected image data 92 on the display 211 upon receiving the instruction signal (Step S101). Next, the control unit 10 stands by until receiving the signal indicative of the touched position from the touch sensor 212 (Step S102: No). Upon receiving the signal indicative of the touched position from the touch sensor 212 (Step S102: Yes), the control unit 10 executes the second preview image displaying process (Step S103), and terminates the preview image displaying process.

Figure 3A:
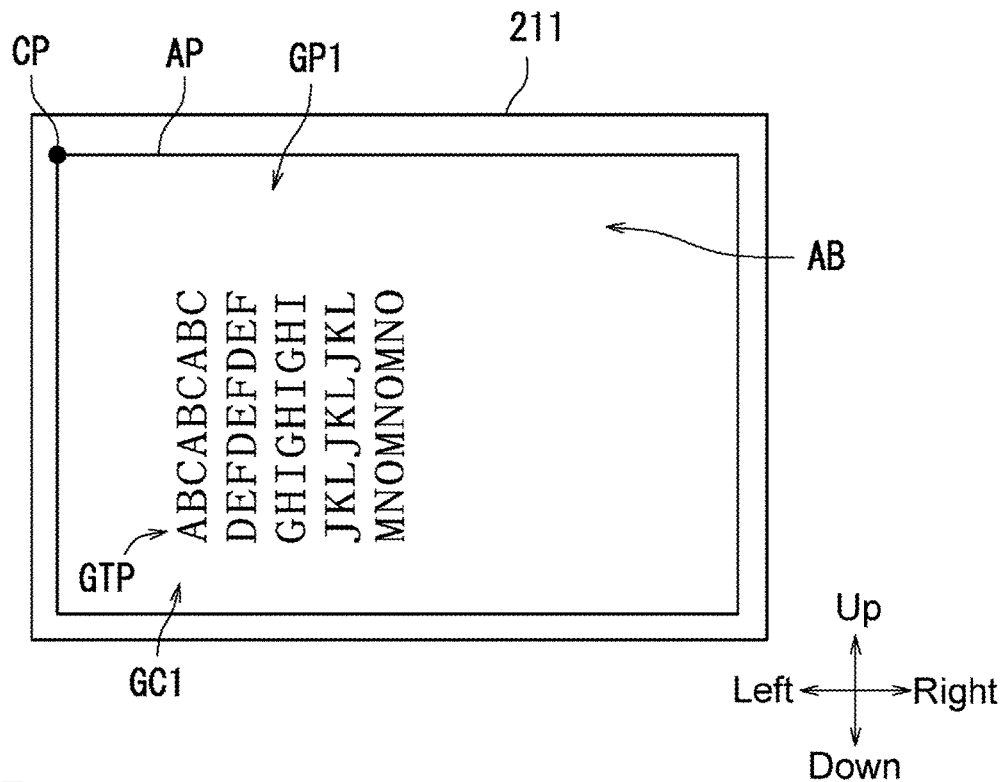
FIGS. 3A and 3B illustrate an example of a first preview image according to Embodiment 1.
Figure 3B:
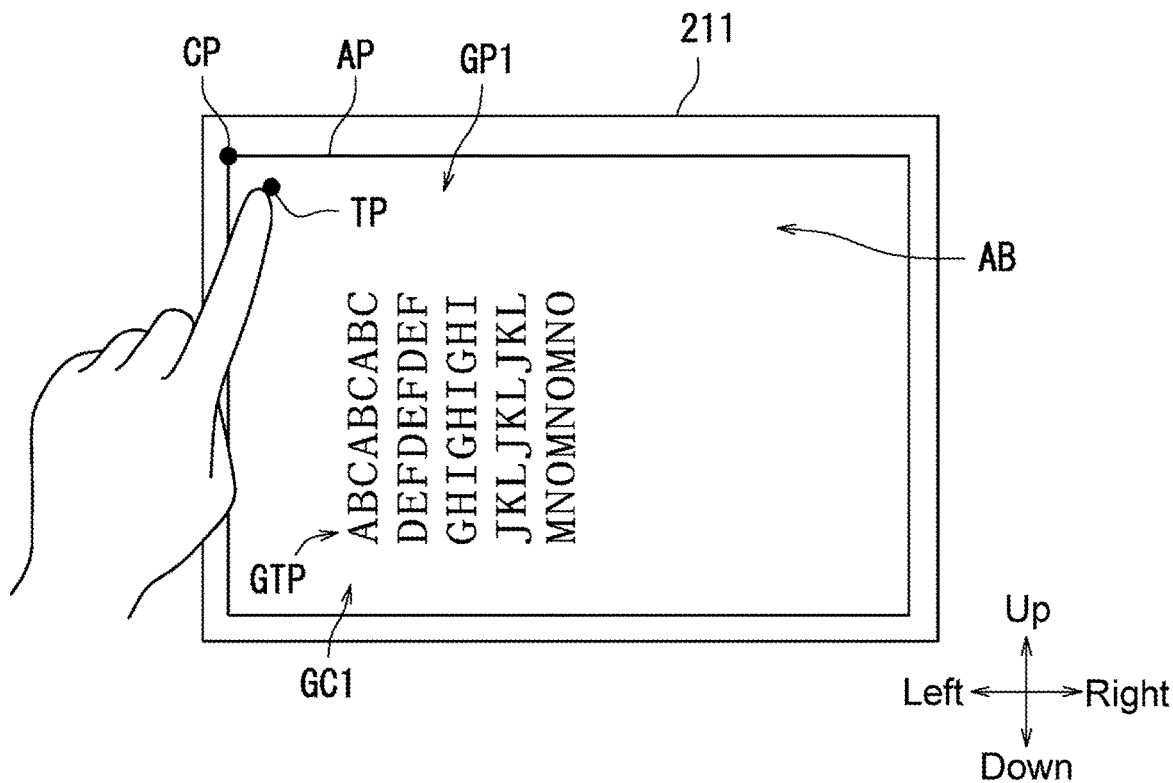

Next, with reference to FIGS. 1 to 3B, a first preview image GP1 according to Embodiment 1 will be described. FIGS. 3A and 3B illustrate one example of the first preview image GP1 according to Embodiment 1. The first preview image GP1 illustrated in FIGS. 3A and 3B correspond to an image printed on one surface of one A4 sized sheet S.

As illustrated in FIGS. 3A and 3B, the display 211 has a preview image display area AP in a rectangular shape. The following describes the embodiments with a longitudinal direction of the preview image display area AP as a right and left direction and a direction perpendicular to the right and left direction as an up and down direction.

The preview image display area AP has an origin CP. The origin CP is located at the upper left corner of the preview image display area AP.

The preview image display area AP displays the first preview image GP1. The first preview image GP1 includes a blank region AB and a first character string image GC1.

The blank region AB indicates a region where pixels the luminance values of which are equal to or less than a threshold value continue for a predetermined pixel count or more.

The first character string image GC1 indicates an image of a character string. In this embodiment, the first character string image GC1 (character string) is configured of a plurality of characters horizontally written from the left side to the right side. In other words, a character writing direction is a direction from the left side toward the right side (direction from lower side toward upper side in FIGS. 3A and 3B). The character writing direction is, for example, stored in the storage device 9 associated with the image data 92.

In an example illustrated in FIG. 3A, the character string is configured of a plurality of characters "ABCABCAB-CDEFDEFDEFJKLJKLJKLMNOMNOMNO." The plurality of characters "ABCABCAB-CDEFDEFDEFJKLJKLJKLMNOMNOMNO" are configured of a plurality of rows. Specifically, the character string is configured of a row configured of a plurality of characters "ABCABCABC," a row configured of a plurality of characters "DEFDEFDEF," a row configured of a plurality of characters "GHIGHIGHI," a row configured of a plurality of characters "JKLJKLJKL," and a row configured of a plurality of characters "MNOMNOMNO." Accordingly, a heading character image GTP that indicates a heading character of the character string configuring the first character string image GC1 is "A."

In an example illustrated in FIG. 3A, a direction of each of the characters configuring the first character string image GC1 is different from a direction of the display 211. For details, each of the characters is displayed on the display 211 such that the upper side of each of the characters is oriented to the left side of the display 211. In other words, each of the characters is displayed on the display 211 in a state of being rotated by 90 degrees in an anticlockwise direction in the drawing. The following describes the embodiments with a clockwise rotation as a positive (+) rotation and an anticlockwise rotation as a negative (−) rotation in the drawing.

As illustrated in FIGS. 3A and 3B, when the user touches any position in the blank region AB, the touch sensor 212 transmits a signal indicative of a touched position TP to the control unit 10.

Upon receiving the signal indicative of the touched position TP (Step S102 in FIG. 2: Yes), the control unit 10 executes a second preview image displaying process (Step S103 in FIG. 2). The control unit 10 executes a first detecting process, a rotation angle obtaining process, a second detecting process, and a magnification rate calculation process in the second preview image displaying process.

Figure 4:
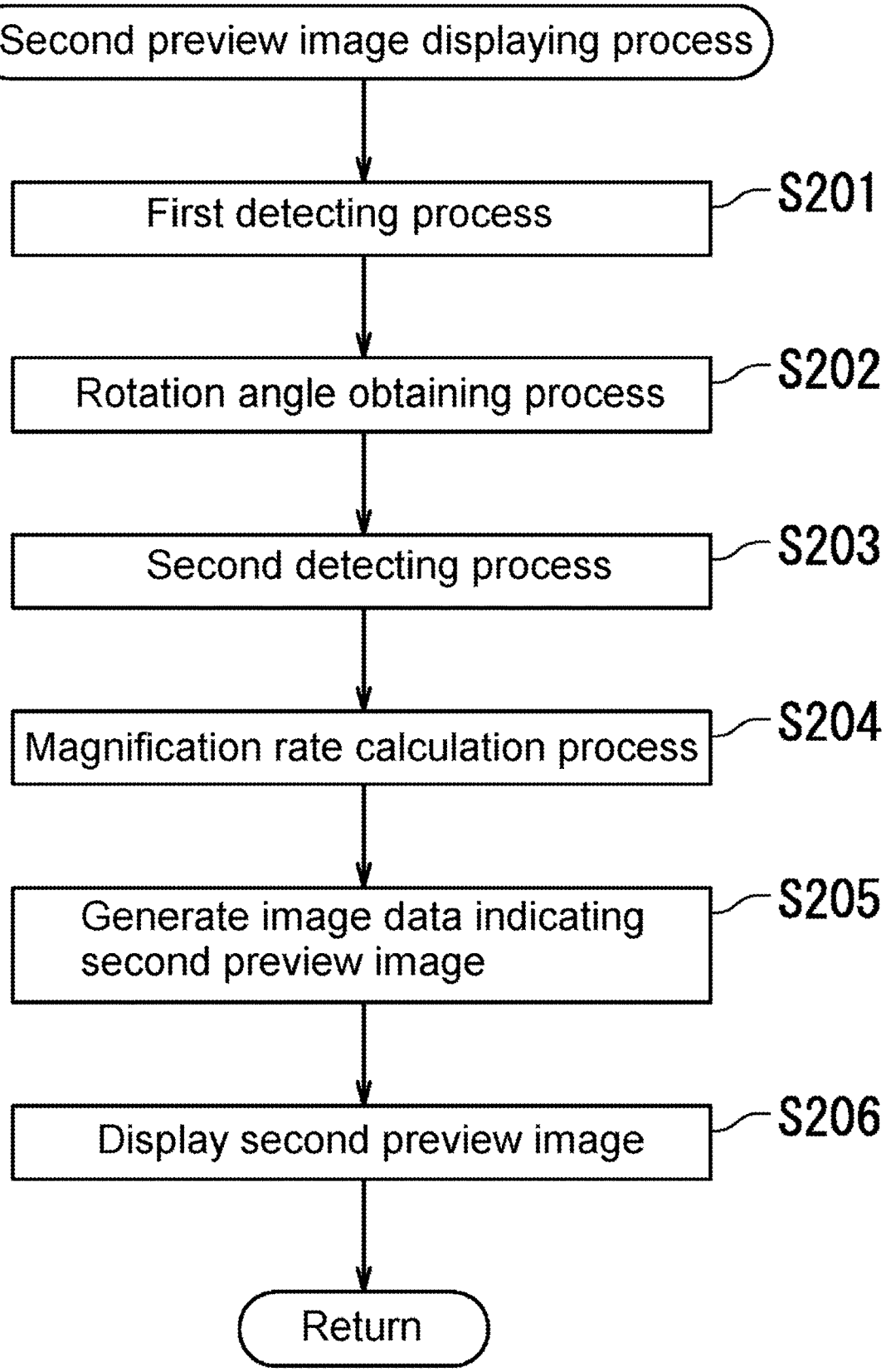
FIG. 4 illustrates a second preview image displaying process according to Embodiment 1.

Next, with reference to FIGS. 1 to 4, the second preview image displaying process according to Embodiment 1 will be described in details. FIG. 4 illustrates the second preview image displaying process according to Embodiment 1.

As illustrated in FIG. 4, the control unit 10 executes the first detecting process upon receiving the signal indicative of the touched position TP (Step S201). For details, the control unit 10 sets an image analysis region and analyzes an image inside the image analysis region to detect a first character image GT1. The first character image GT1 indicates a character image that is detected first when the image is analyzed with the touched position TP as an origin in the first character string image GC1.

Next, the control unit 10 executes the rotation angle obtaining process (Step S202). For details, the control unit 10 obtains a rotation angle at which the first preview image GP1 is rotated such that the first character image has a predetermined direction. Next, the control unit 10 executes the second detecting process (Step S203). For details, the control unit 10 detects the heading character image GTP by analyzing the image included in the first preview image GP1 with the first character image as an origin.

Next, the control unit 10 executes the magnification rate calculation process (Step S204). For details, the control unit 10 obtains a display size that indicates a size in the up and down direction when the heading character image GTP is displayed on the display 211. Upon obtaining the display size, the control unit 10 calculates the magnification rate based on the display size and the specified size. The specified size is, for example, set in advance by an administrator.

Next, the control unit 10 generates image data that indicates the second preview image (Step S205). For details, the control unit 10 generates the image data that indicates the second preview image by rotating the first preview image GP1 at the obtained rotation angle and enlarging the first preview image GP1 at the calculated magnification rate. Next, the control unit 10 displays the second preview image on the display 211 (Step S206), and terminates the second preview image displaying process.

Figure 5:
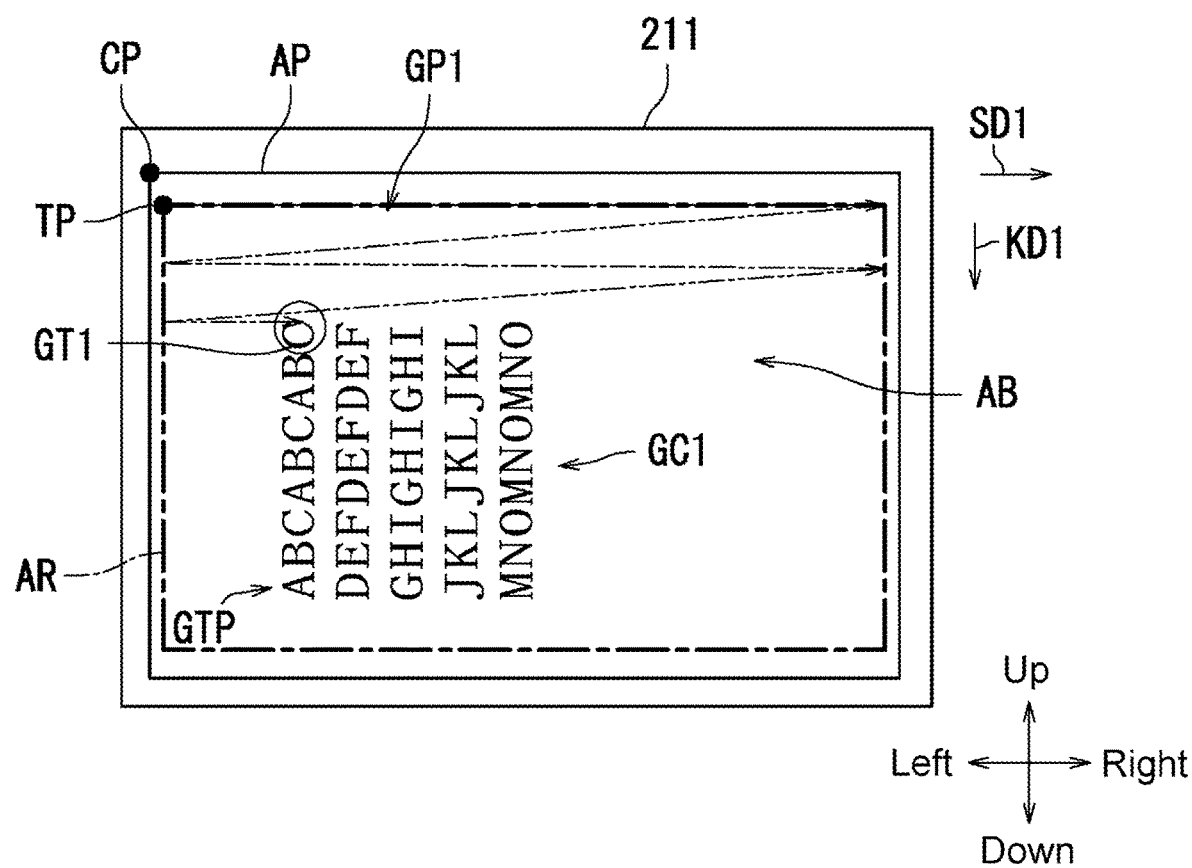
FIG. 5 illustrates a first detecting process according to Embodiment 1.

Next, with reference to FIGS. 1 to 5, the first detecting process according to Embodiment 1 will be described. FIG. 5 illustrates the first detecting process according to Embodiment 1. For details, FIG. 5 illustrates the first detecting process on the first preview image GP1 described with reference to FIG. 3A. In FIG. 5, for ease of understanding, the two-dot chain line indicates an order in which the control unit 10 analyzes the first preview image GP1, the one-dot chain line indicates an image analysis region AR, and the first character image GT1 is circled.

As illustrated in FIG. 5, the control unit 10 sets the image analysis region AR upon receiving the signal indicative of the touched position TP. In this embodiment, the image analysis region AR has a rectangular shape with a line segment extending lower rightward as one diagonal line with the touched position TP as an origin. The diagonal line, for example, extends to the lower right at an angle of 45 degrees from the touched position TP.

The control unit 10 executes an analysis on the image in the image analysis region AR upon setting the image analysis region AR. The image analysis is, for example, executed using a character recognition technique.

For details, the control unit 10 repeatedly executes the analysis of the image in a repeat direction KD1 along a first analysis direction SD1 in the image analysis region AR. In the example illustrated in FIG. 5, the control unit 10 repeatedly executes the analysis of the image, which is from the left side to the right side, from the upper side to the lower side in the image analysis region AR. That is, in the example illustrated in FIG. 5, the first analysis direction SD1 is a direction from the left side toward the right side, and the repeat direction KD1 is a direction from the upper side toward the lower side.

The control unit 10 detects, for example, the first character image GT1 based on changes in luminance values of the respective pixels in the image analysis region AR. Specifically, the control unit 10 detects the first character image GT1 based on the changes from the pixels the luminance values of which are smaller than the threshold value to the pixels the luminance values of which are greater than the threshold value. In this embodiment, the first character image GT1 includes the pixels changed to the pixels the luminance values of which are greater than the threshold value.

In the example illustrated in FIG. 5, the control unit 10 detects a character image "C" at the upper left corner of the first character string image GC1 as the first character image GT1. The first character image GT1 "C" opposes the heading character image GTP "A" in the character writing direction (up and down direction in FIG. 5). For details, the first character image GT1 "C" indicates a character image at the end on the opposite side of the heading character image GTP in the character writing direction.

The control unit 10 terminates the first detecting process upon detecting the first character image GT1. The control unit 10 executes the rotation angle obtaining process after terminating the first detecting process.

Figure 6A:
FIGS. 6A and 6B illustrate drawings to describe a rotation angle obtaining process according to Embodiment 1.
Figure 6B:
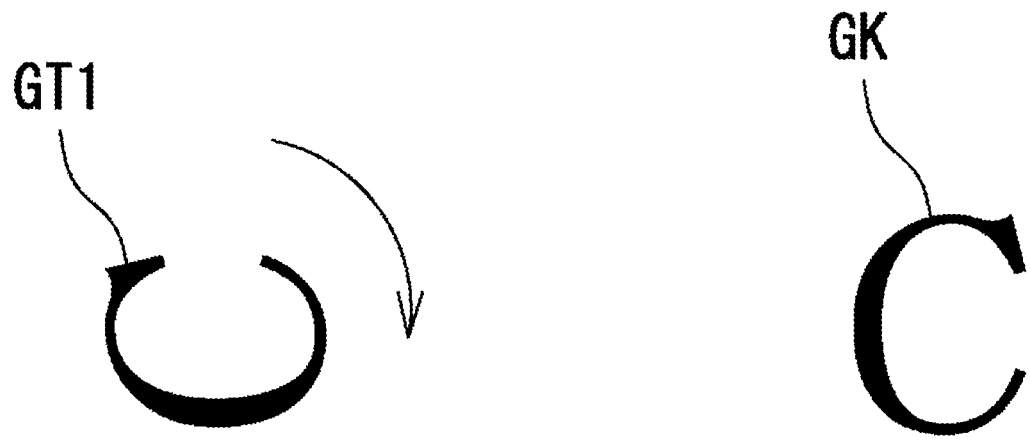

Next, with reference to FIGS. 6A and 6B, the rotation angle obtaining process according to Embodiment 1 will be described. FIGS. 6A and 6B illustrate drawings to describe the rotation angle obtaining process according to Embodiment 1.

In the rotation angle obtaining process, the control unit 10 obtains data indicative of a first character indicated by the first character image GT1. The data indicative of the first character is, for example, a character code. The data indicative of the first character is, for example, obtained by using the character recognition technique.

The control unit 10 obtains a specified character image GK stored in advance in the storage device 9 based on the data indicative of the first character upon obtaining the data indicative of the first character. The specified character image GK indicates a character that matches the first character in the image showing the plurality of characters. An upper side of the specified character image GK corresponds to an upper side of the display 211 when displayed on the display 211.

The control unit 10 obtains the rotation angle by determining whether the first character image GT1 matches the specified character image GK or not upon obtaining the specified character image GK. The determination of whether the first character image GT1 matches the specified character image GK or not is executed by, for example, pattern matching.

As illustrated in FIG. 6A, the control unit 10 obtains "0 degree" as the rotation angle upon determining that the first character image GT1 matches the specified character image GK. Meanwhile, as illustrated in FIG. 6B, the control unit 10 rotates the first character image GT1 at each predetermined angle upon determining that the first character image GT1 does not match the specified character image GK. The predetermined angle is, for example, "+90 degrees." The predetermined angle may be, for example, "−90 degrees."

The control unit 10 determines whether the first character image GT1 rotated at the predetermined angle matches the specified character image GK or not. The control unit 10 determines whether the first character image GT1 further rotated at the predetermined angle matches the specified character image GK or not upon determining that the first character image GT1 rotated at the predetermined angle does not match the specified character image GK. That is, the control unit 10 determines whether the first character image GT1 matches the specified character image GK or not by rotating the first character image GT1 at each predetermined angle. The control unit 10 rotates the first character image GT1 at each predetermined angle until the first character image GT1 is determined to match the specified character image GK.

The control unit 10 stores a sum angle at which the first character image GT1 was rotated until the determination that the first character image GT1 matches the specified character image GK was made as a temporary rotation angle in the storage device 9. For example, the temporary rotation angle is "+180 degrees" when the control unit 10 rotates the first character image GT1 twice at each +90 degrees.

The control unit 10 obtains the temporary rotation angle as the rotation angle upon determining that the first character image GT1 rotated by the temporary rotation angle matches the specified character image GK. In the example illustrated in FIG. 6B, the control unit 10 obtains "+90 degrees" as the rotation angle.

Figure 7:
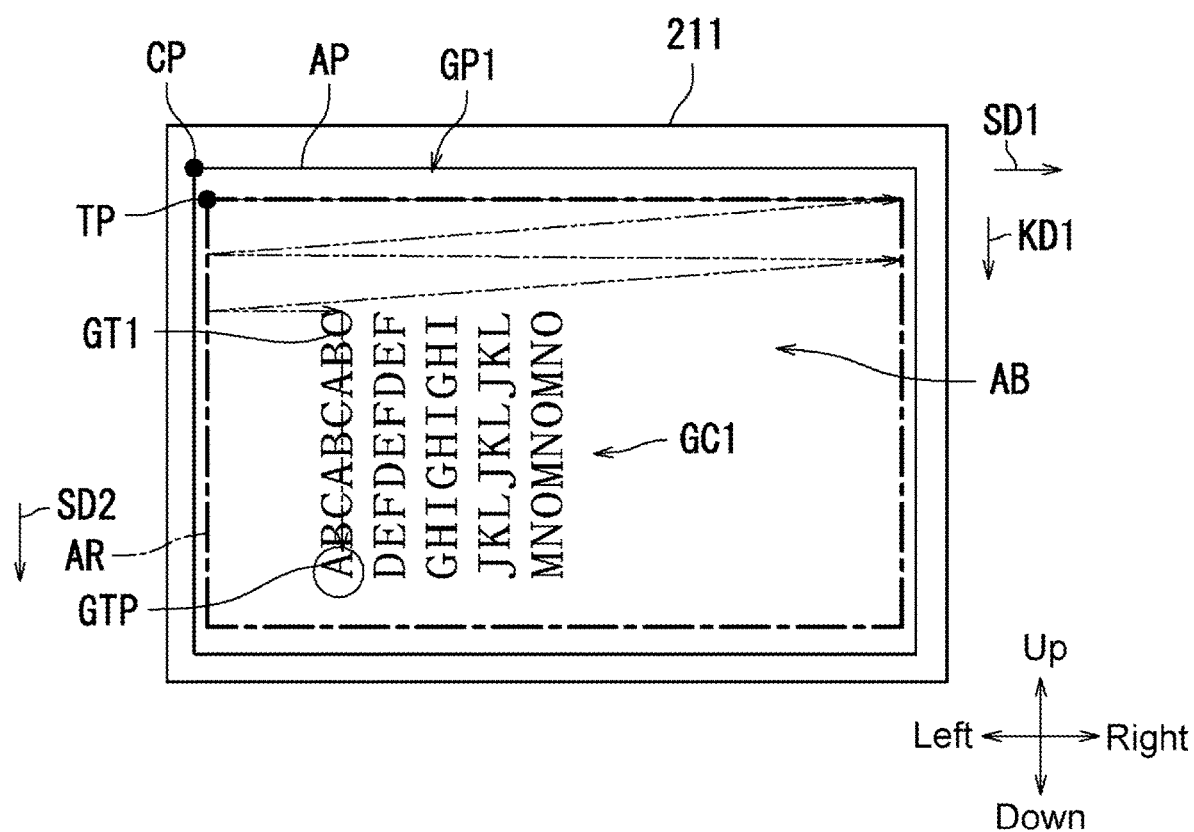
FIG. 7 illustrates a second detecting process according to Embodiment 1.

Next, with reference to FIGS. 1 to 7, the second detecting process according to Embodiment 1 will be described. FIG. 7 illustrates the second detecting process according to Embodiment 1. For details, FIG. 7 illustrates the second detecting process on the first preview image GP1 described with reference to FIG. 3A. In FIG. 7, for ease of understanding, the two-dot chain line indicates an order in which the control unit 10 analyzes the first preview image GP1, the one-dot chain line indicates the image analysis region AR, and the heading character image GTP is circled.

As illustrated in FIG. 7, the control unit 10 determines a second analysis direction SD2 indicating a direction to analyze the image with the first character image GT1 as an origin based on the rotation angle and the character writing direction upon detecting the first character image GT1. For details, the control unit 10 determines the second analysis direction SD2 by estimating a position of the heading character image GTP with respect to the first character image GT1 based on the rotation angle and the character writing direction. As described with reference to FIGS. 3A, 6A, and 6B, in the embodiment, the rotation angle is "+90 degrees," and the character writing direction is a direction from the left side toward the right side. Accordingly, the control unit 10 estimates that the heading character image GTP is at a downward direction of the first character image GT1 to determine the second analysis direction SD2 to be a direction from the upper side toward the lower side. The second analysis direction SD2 intersects with the first analysis direction SD1. In this embodiment, the second analysis direction SD2 is perpendicular to the first analysis direction SD1.

The control unit 10 detects the heading character image GTP by analyzing the image along the second analysis direction SD2 with the first character image GT1 as an origin in the image analysis region AR upon determining the second analysis direction SD2. The control unit 10, for example, detects the heading character image GTP based on changes in luminance values of the respective pixels. Specifically, the control unit 10 detects the heading character image GTP based on the changes from pixels the luminance values of which are greater than the threshold value to pixels the luminance values of which are equal to or less than the threshold value. In this embodiment, the control unit 10 detects a character image configured of pixels located at a near side of the pixels the luminance values of which change to equal to or less than the threshold value as the heading character image GTP.

In the example illustrated in FIG. 7, the control unit 10 detects a character "A" at the lower-left corner of the first character string image GC1 as the heading character image GTP.

The control unit 10 terminates the second detecting process upon detecting the heading character image GTP, and executes the magnification rate calculation process.

Figure 8A:
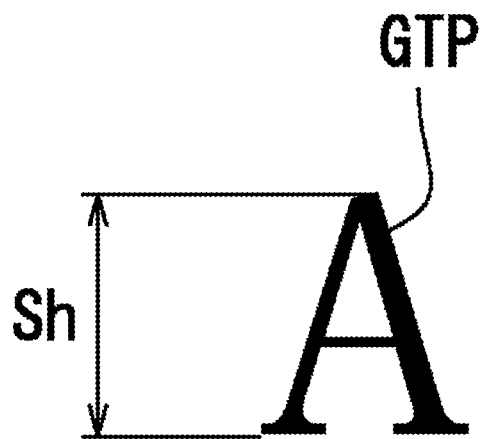
FIGS. 8A and 8B illustrate drawings to describe a magnification rate calculating process according to Embodiment 1.
Figure 8B:
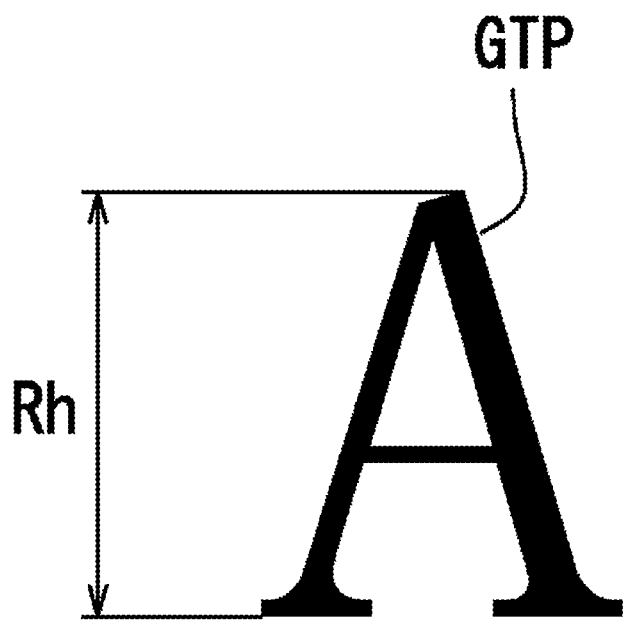

Next, with reference to FIGS. 1 to 8A, and 8B, the magnification rate calculation process according to Embodiment 1 will be described. FIGS. 8A and 8B illustrate drawings to describe the magnification rate calculation process according to Embodiment 1. In FIGS. 8A and 8B, a description will be given of an example of when the character image "A" described with reference to FIG. 7 is the heading character image GTP.

The control unit 10 obtains a display size Sh of the heading character image GTP upon detecting the heading character image GTP. The control unit 10 calculates the magnification rate based on the display size Sh and a specified size Rh upon obtaining the display size Sh. The specified size Rh is stored in advance in the storage device 9.

The control unit 10 calculates the magnification rate such that the display size Sh of the character image "A" illustrated in FIG. 8A is displayed at the specified size Rh illustrated in FIG. 8B on the display 211. The control unit 10 terminates the magnification rate calculation process upon calculating the magnification rate.

The control unit 10 generates image data of a second preview image GP2 upon terminating the magnification rate calculation process. The second preview image GP2 indicates the preview image obtained by the first preview image GP1 being enlarged at the magnification rate and rotated at the rotation angle.

Figure 9:
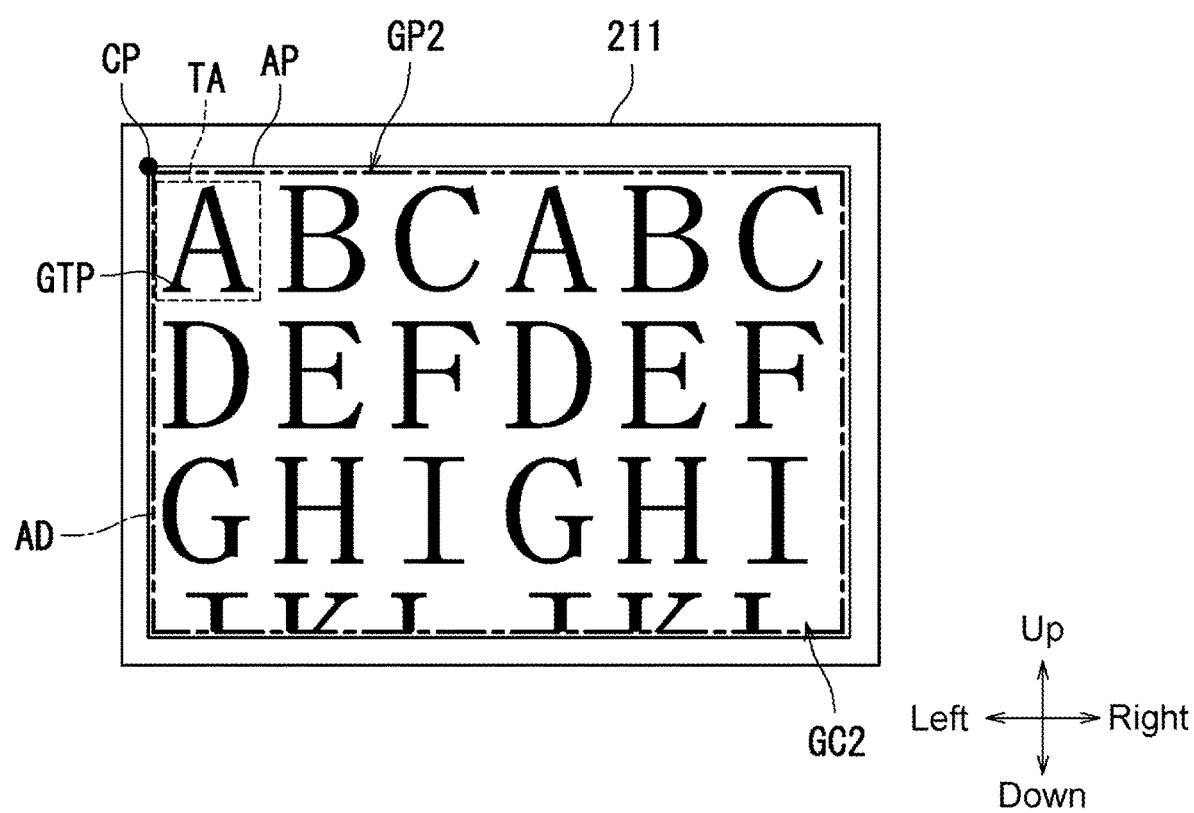
FIG. 9 illustrates an example of a second preview image according to Embodiment 1.

Next, with reference to FIG. 9, the second preview image GP2 according to Embodiment 1 will be described. FIG. 9 illustrates an example of the second preview image GP2 according to Embodiment 1. For details, FIG. 9 illustrates the second preview image GP2 displayed on the display 211 when the touched position TP illustrated in FIG. 3B is touched. In FIG. 9, for ease of understanding, the one-dot chain line indicates a display area AD.

As illustrated in FIG. 9, the control unit 10 sets the display area AD when the image data of the second preview image GP2 is generated. In this embodiment, the display area AD is set so as to include the heading character image GTP. For details, the display area AD is set such that the heading character image GTP is displayed at the proximity of the origin CP of the preview image display area AP. Specifically, the display area AD is set such that a position at the upper left corner of a rectangular TA that surrounds the heading character image GTP matches the position of the origin CP of the preview image display area AP. The control unit 10, for example, sets the display area AD such that a position closest to the origin CP of the preview image display area AP in the rectangular TA matches the position of the origin CP of the preview image display area AP.

The second preview image GP2 includes an image surrounded by a region set by the display area AD. For details, the second preview image GP2 includes a second character string image GC2. The second character string image GC2 shows a part of the first character string image GC1 (see FIG. 3A) enlarged at the calculated magnification rate and rotated at the obtained rotation angle (+90 degrees).

Embodiment 1 has been described above. According to this embodiment, the control unit 10 detects the first character image GT1, and obtains the rotation angle based on the first character image GT1. The rotation angle indicates the angle at which the first preview image GP1 is rotated such that the direction of the first character image GT1 matches the direction of the display 211. The control unit 10 displays the second preview image GP2 obtained by rotating the first preview image GP1 at the obtained rotation angle on the display 211. Accordingly, even when the direction of the first preview image GP1 does not match the direction of the display 211, the direction of each character image matches the direction of the display 211 and is displayed on the display 211. Accordingly, user's visibility of the preview image can be improved.

According to this embodiment, the control unit 10 determines the second analysis direction SD2 based on the rotation angle and the character writing direction upon obtaining the rotation angle. Accordingly, according to this embodiment, even when the direction of the first preview image GP1 does not match the direction of the display 211, the heading character image GTP is detected.

For example, if character images other than ones at the proximity of the heading character image GTP among the characters included in the first character string image GC1 are displayed on the display 211, it is difficult for the user to recognize whether the selected image data 92 is the desired image data 92 or not. According to this embodiment, the control unit 10 detects the heading character image GTP, and sets the display area AD so as to include the proximity of the heading character image GTP, even when the direction of the first preview image GP1 does not match the direction of the display 211. The control unit 10 displays the second preview image GP2 including the image surrounded by the set display area AD on the display 211. Accordingly, the user's visibility of the preview image improves.

According to this embodiment, the second preview image GP2 has the position at the upper left corner of the rectangular TA, which surrounds the heading character image GTP, matching the position of the origin CP of the preview image display area AP. Accordingly, the user's visibility of the preview image further improves.

Figure 10A:
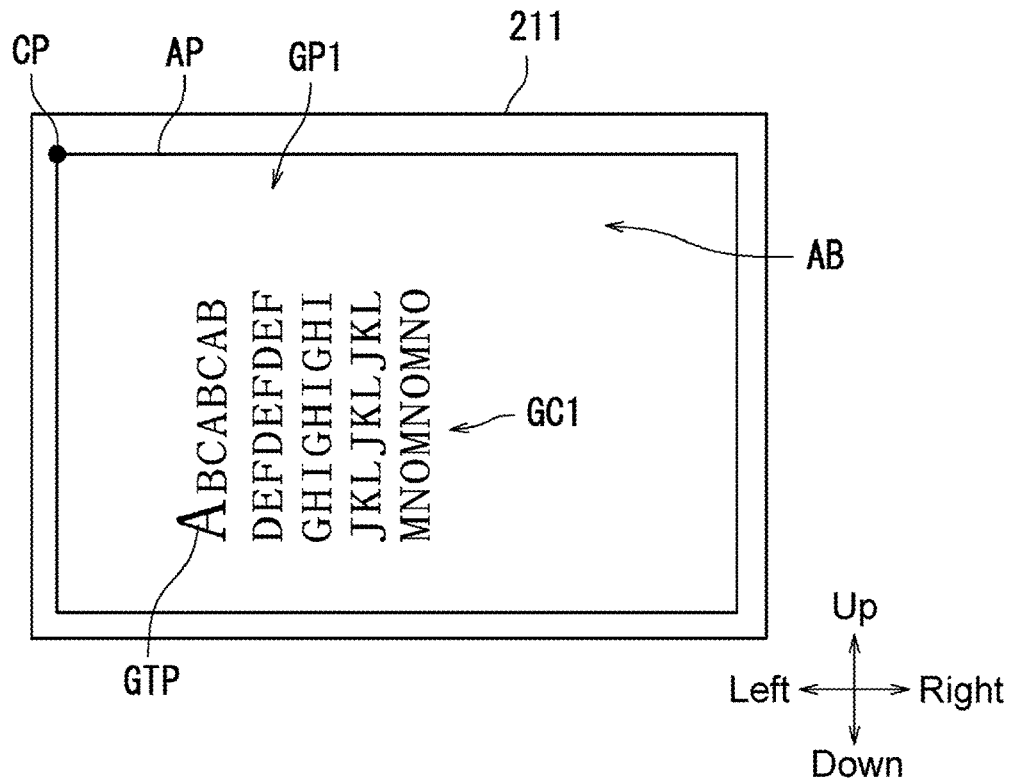
FIG. 10A illustrates a modification of the first preview image according to Embodiment 1.
Figure 10B:
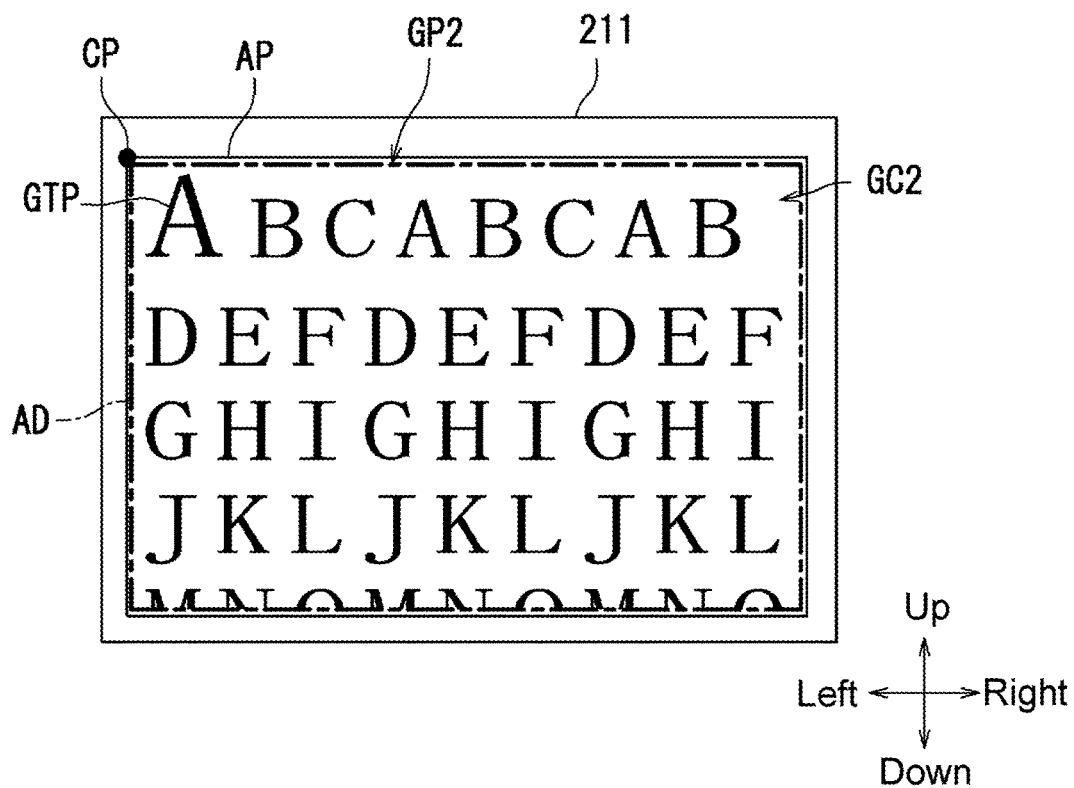
FIG. 10B illustrates an example of the second preview image corresponding to FIG. 10A.

In this embodiment, while the example where the respective display sizes Sh of the plurality of character images are equal has been described, the respective display sizes Sh of the plurality of character images may be different. FIG. 10A illustrates a modification of the first preview image GP1 according to Embodiment 1. FIG. 10B illustrates an example of the second preview image GP2 corresponding to the first preview image GP1 illustrated in FIG. 10A.

For example, when the display size Sh of the heading character image GTP is larger than the display sizes Sh of the other character images in the first preview image GP1 as illustrated in FIG. 10A, the size Sh of the heading character image GTP is displayed larger than the display sizes Sh of the other character images in the second preview image GP2 as illustrated in FIG. 10B.

Embodiment 2

Next, with reference to FIGS. 1, 2, 9, and 11, the display processing device 1 according to Embodiment 2 will be described. In Embodiment 2, a direction of each of the characters configuring the first character string image GC1 is different from that in Embodiment 1. The following describes matters regarding Embodiment 2 that are different from those in Embodiment 1, and the description about a part that overlaps Embodiment 1 will be omitted.

Figure 11:
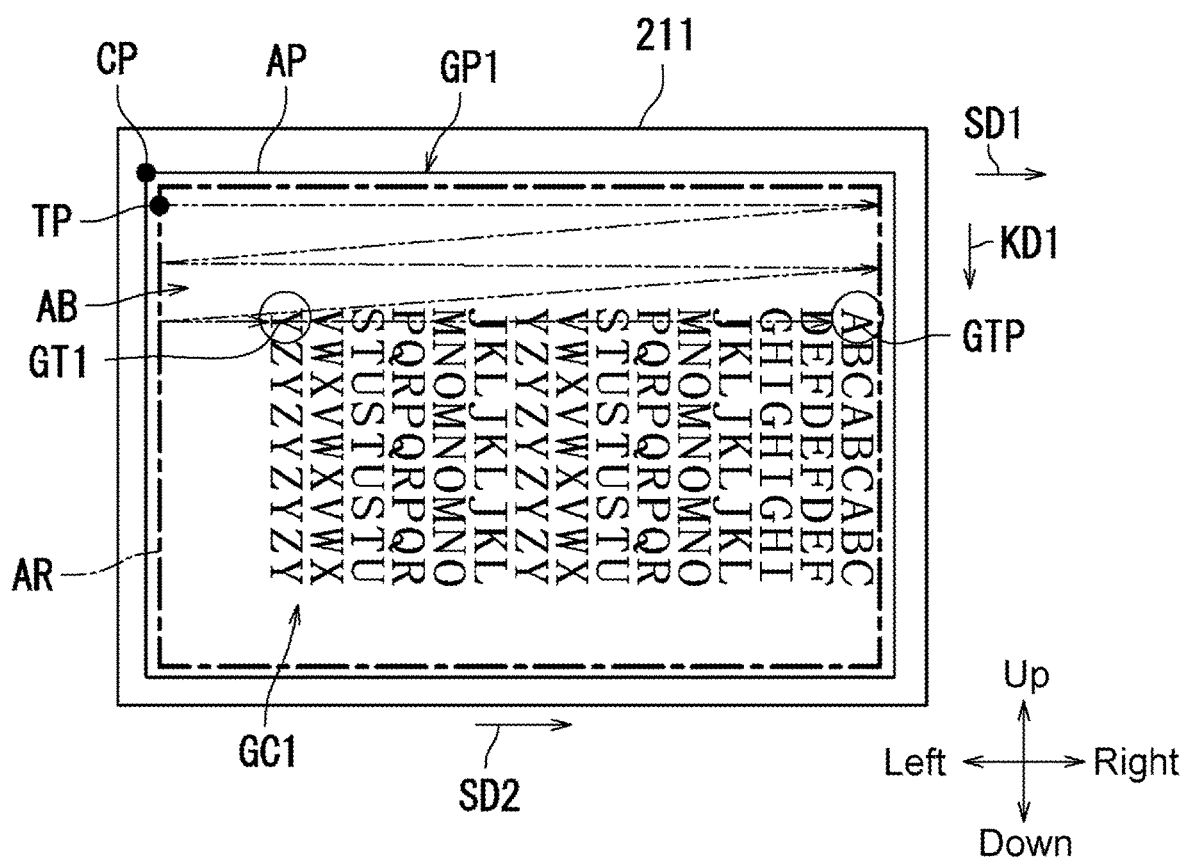
FIG. 11 illustrates an example of a first preview image according to Embodiment 2 of the disclosure.

FIG. 11 illustrates an example of the first preview image GP1 according to Embodiment 2.

As illustrated in FIG. 11, the first preview image GP1 is displayed on the preview image display area AP. The first preview image GP1 includes the first character string image GC1.

The direction of each of the characters configuring the first character string image GC1 is different from the direction of the display 211. For details, each of the characters is displayed on the display 211 such that the upper side of each of the characters is orientated to the right side of the display 211. In other words, each of the characters is displayed on the display 211 in a state of being rotated by +90 degrees in the drawing.

When the user touches any position in the blank region AB, the touch sensor 212 transmits the signal indicative of the touched position TP to the control unit 10.

The control unit 10 executes the first detecting process similarly to Embodiment 1 upon receiving the signal indicative of the touched position TP. For details, the control unit 10 sets the image analysis region AR, and executes the analysis of an image included in the first preview image GP1 in the image analysis region AR. For more details, the control unit 10 repeatedly executes the analysis of the image in the repeat direction KD1 along the first analysis direction SD1 in the image analysis region AR. In the example illustrated in FIG. 11, the control unit 10 repeatedly executes the analysis of the image, which is from the left side to the right side, from the upper side to the lower side in the image analysis region AR. That is, in the example illustrated in FIG. 11, the first analysis direction SD1 is a direction from the left side toward the right side, and the repeat direction KD1 is a direction from the upper side toward the lower side.

In this embodiment, the control unit 10 detects the character image "Y" on the upper left side of the first character string image GC1 as the first character image GT1. The control unit 10 terminates the first detecting process upon detecting the first character image GT1, and executes the rotation angle obtaining process.

In this embodiment, each of the characters is displayed on the display 211 in a state of being rotated by +90 degrees in the drawing. Accordingly, the control unit 10 obtains "−90 degrees" as the rotation angle by executing the rotation angle obtaining process.

The control unit 10 terminates the rotation angle obtaining process upon obtaining the rotation angle, and executes the second detecting process.

In the second detecting process, the control unit 10 determines the second analysis direction SD2 based on the rotation angle and the character writing direction. In this embodiment, the second analysis direction SD2 is a direction from the left side toward the right side. In other words, in this embodiment, the second analysis direction SD2 is parallel to the first analysis direction SD1.

The control unit 10 detects the heading character image GTP by analyzing the image of the image analysis region AR along the second analysis direction SD2 with the first character image GT1 as an origin.

In this embodiment, the control unit 10 detects the character "A" at the upper right corner as the heading character image GTP. The control unit 10 terminates the second detecting process upon detecting the heading character image GTP, and executes the magnification rate calculation process similarly to Embodiment 1.

The control unit 10 generates image data of the second preview image GP2 upon terminating the magnification rate calculation process, and displays the second preview image GP2 on the display 211 as illustrated in FIG. 9. The second preview image GP2 shows the preview image obtained by the first preview image GP1 being enlarged at the magnification rate and rotated at the rotation angle.

Embodiment 2 has been described above. According to this embodiment, the character images at the proximity of the heading character image GTP are enlarged and the second preview image GP2 is displayed so as to match the direction of the display 211. Accordingly, the user's visibility of the preview image can be improved.

Embodiment 3

Next, with reference to FIGS. 1, 2, 9, and 12, the display processing device 1 according to Embodiment 3 will be described. In Embodiment 3, a direction of each of the characters configuring the first character string image GC1 is different from those of Embodiments 1 and 2. The following describes matters regarding Embodiment 3 different from those in Embodiments 1 and 2, and the description about a part that overlaps Embodiments 1 and 2 will be omitted.

Figure 12:
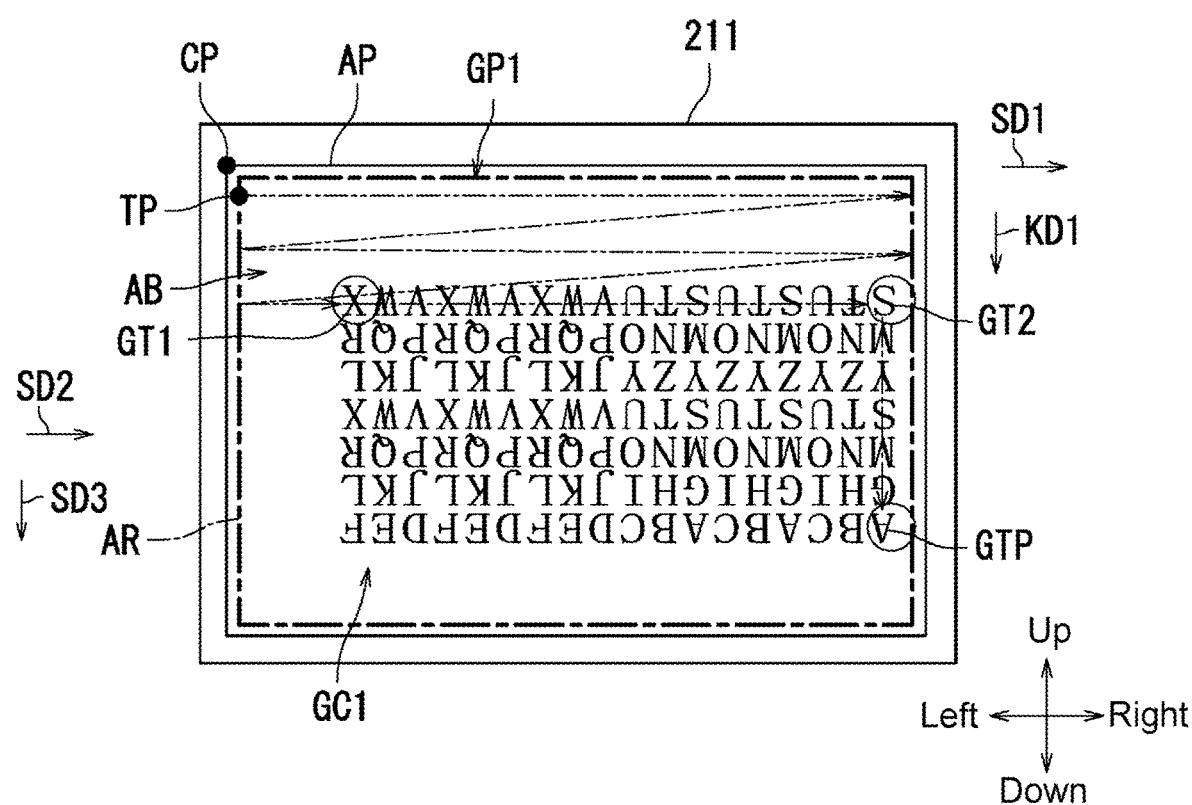
FIG. 12 illustrates an example of a first preview image according to Embodiment 3 of the disclosure.

FIG. 12 illustrates an example of the first preview image GP1 according to Embodiment 3.

As illustrated in FIG. 12, the first preview image GP1 is displayed on the preview image display area AP. The first preview image GP1 includes the first character string image GC1.

The direction of each of the characters configuring the first character string image GC1 is different from the direction of the display 211. For details, each of the characters is displayed on the display 211 such that the upper side of each of the characters is oriented to the lower side of the display 211. In other words, each of the characters is displayed on the display 211 in a state of being rotated by +180 (−180) degrees in the drawing.

When the user touches any position in the blank region AB, the touch sensor 212 transmits the signal indicative of the touched position TP to the control unit 10.

The control unit 10 executes the first detecting process similarly to Embodiment 1 after receiving the signal indicative of the touched position TP. For details, the control unit 10 sets the image analysis region AR, and executes an analysis of an image included in the first preview image GP1 in the image analysis region AR. For more details, the control unit 10 repeatedly executes the analysis of an image in the repeat direction KD1 along the first analysis direction SD1 in the image analysis region AR. In the example illustrated in FIG. 12, the control unit 10 repeatedly executes the analysis of the image, which is from the left side toward the right side, from the upper side toward the lower side in the image analysis region AR. That is, in the example illustrated in FIG. 12, the first analysis direction SD1 is a direction from the left side toward the right side, and the repeat direction KD1 is a direction from the upper side toward the lower side.

In this embodiment, the control unit 10 detects the character image "X" at the upper left side of the first character string image GC1 as the first character string image GT1. The control unit 10 terminates the first detecting process upon detecting the first character string image GT1, and then executes the rotation angle obtaining process.

In this embodiment, each of the characters is displayed on the display 211 in a state of being rotated by +180 (−180) degrees in the drawing. Accordingly, the control unit 10 obtains "−180 degrees (+180 degrees)" as the rotation angle by executing the rotation angle obtaining process.

The control unit 10 terminates the rotation angle obtaining process upon obtaining the rotation angle, and executes the second detecting process.

In the second detecting process, the control unit 10 determines the second analysis direction SD2 and a third analysis direction SD3 based on the rotation angle and the character writing direction. The second analysis direction SD2 indicates a direction in which the image is analyzed with the first character image GT1 as an origin. The third analysis direction SD3 illustrates a direction in which the image is analyzed with a second character image GT2 as an origin. In this embodiment, the second analysis direction SD2 is a direction from the left side toward the right side, and the third analysis direction SD3 is a direction from the upper side toward the lower side. In other words, the second analysis direction SD2 is parallel to the first analysis direction SD1. The third analysis direction SD3 intersects with the first analysis direction SD1 and the second analysis direction SD2. In this embodiment, the third analysis direction SD3 is perpendicular to the first analysis direction SD1 and the second analysis direction SD2.

The control unit 10 detects the second character image GT2 by analyzing the image of the image analysis region AR along the second analysis direction SD2 with the first character image GT1 as an origin. The second character image GT2 shows the character image opposing the first character image GT1 in the second analysis direction SD2. For details, the second character image GT2 shows the character image at an end in the opposite side of the first character image GT1.

In this embodiment, the control unit 10 detects the character image "S" at the upper right side of the first character string image GC1 as the second character image GT2.

The control unit 10 detects the heading character image GTP by analyzing an image in the image analysis region AR along the third analysis direction SD3 with the second character image GT2 as an origin upon detecting the second character image GT2.

In this embodiment, the heading character image GTP opposes the second character image GT2 in the third analysis direction SD3. Accordingly, the control unit 10 detects the character image "A" at the lower right side of the first character string image GC1 as the heading character image GTP.

The control unit 10 terminates the second detecting process, and executes the magnification rate calculation process similarly to Embodiment 1 upon detecting the heading character image GTP.

The control unit 10 generates image data of the second preview image GP2 upon terminating the magnification rate calculation process, and displays the second preview image GP2 on the display 211 as illustrated in FIG. 9. The second preview image GP2 shows a preview image obtained by the first preview image GP1 being enlarged at the magnification rate and rotated at the rotation angle.

Embodiment 3 has been described above. According to this embodiment, the character image at the proximity of the heading character image GTP is enlarged, and the second preview image GP2 is displayed so as to match the direction of the display 211. Accordingly, the user's visibility of the preview image can be improved.

Embodiment 4

Next, with reference to FIG. 13, the display processing device 1 according to Embodiment 4 will be described. In Embodiment 4, the difference from Embodiments 1 to 3 is that the display processing device 1 is included in the image forming apparatus 100. The following describes matters regarding Embodiment 4 different from those in Embodiments 1 to 3, and the description about a part that overlaps Embodiments 1 to 3 will be omitted.

Figure 13:
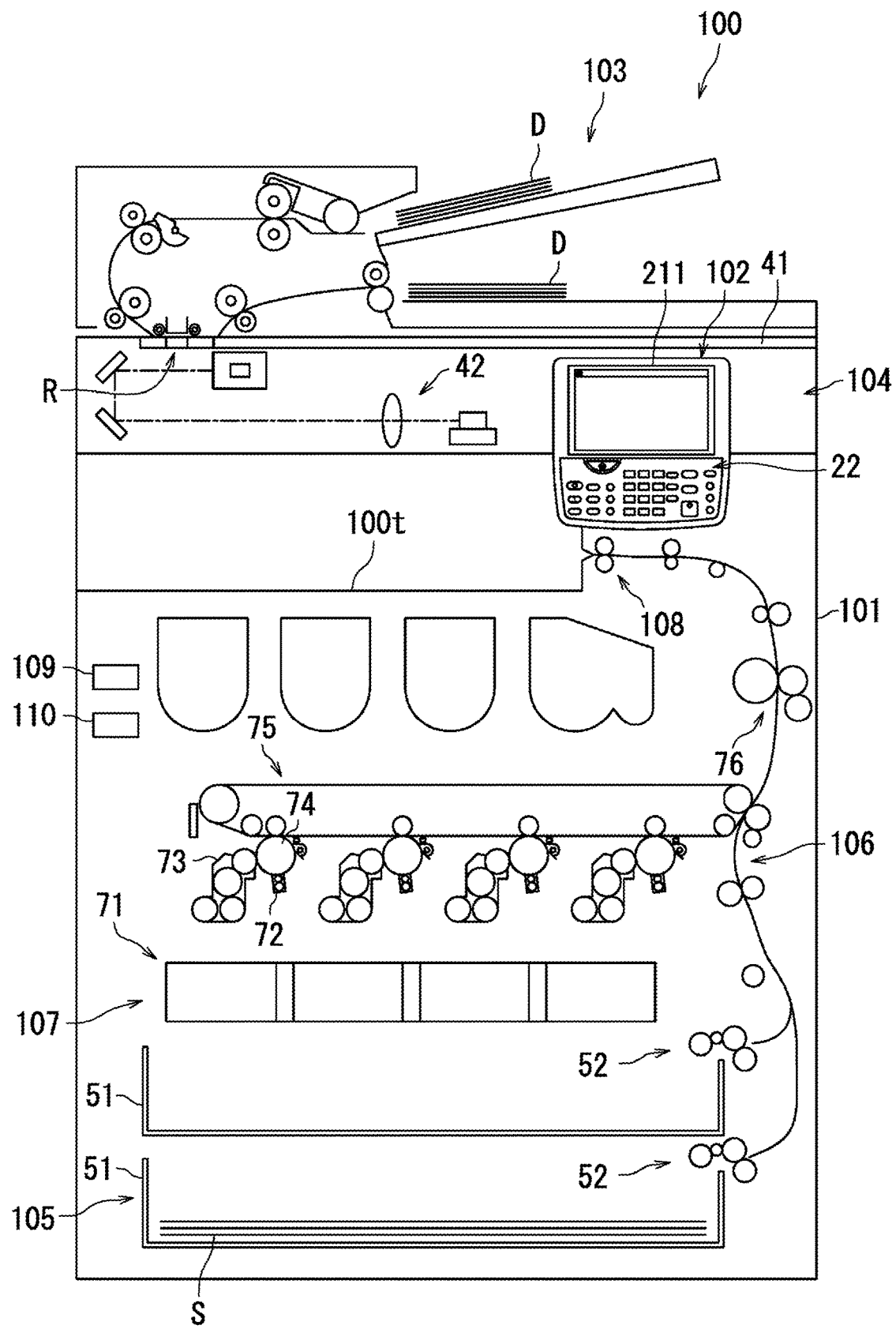
FIG. 13 illustrates an image forming apparatus according to Embodiment 4 of the disclosure.

FIG. 13 illustrates an image forming apparatus 100 according to Embodiment 4. As illustrated in FIG. 13, the image forming apparatus 100 includes a housing 101, an operation unit 102, a document feeder 103, a document reading unit 104, a paper sheet feeder 105, a sheet conveying unit 106, a printing unit 107, a discharge unit 108, a discharge tray 100t, a storage device 109, and a control unit 110. The operation unit 102 doubles as the operation unit 2 of the display processing device 1. The storage device 109 doubles as the storage device 9 of the display processing device 1. The control unit 110 doubles as the control unit 10 of the display processing device 1.

The operation unit 102 accepts an instruction from the user to the image forming apparatus 100. The operation unit 102 outputs a signal indicative of the instruction from the user upon accepting the instruction from the user.

The document feeder 103 conveys a document D. The document feeder 103 includes a document placement tray, a document conveying unit, and a document discharge tray. The document conveying unit conveys the document D placed on the document placement tray one by one to the original document discharge tray via a reading position R. The reading position R is a position at which the document reading unit 104 can read an image on the document D.

The document reading unit 104 reads the image on the document D, and generates data that indicates the image on the document D. The document reading unit 104 includes a contact glass 41 and a reading mechanism 42. On the contact glass 41, the document D is placed. The reading mechanism 42 reads the image on the document D placed on the contact glass 41 or the image on the document D passing through the reading position R to generate image data that shows the image on the document D.

The paper sheet feeder 105 houses a plurality of sheets S, and paper feeds the housed plurality of sheets S one by one. The sheet conveying unit 106 conveys the paper fed sheets S to the discharge unit 108. The sheets S are, for example, paper sheets.

The sheet conveying unit 106 includes a roller and a guiding member. The sheet conveying unit 106 conveys the sheet S from the paper sheet feeder 105 to the discharge unit 108. The sheet S is conveyed via the printing unit 107.

The printing unit 107 forms an image onto the sheet S. In this embodiment, the printing unit 107 includes an exposure apparatus 71, a charging apparatus 72, a developing device 73, a photoreceptor drum 74, a transfer apparatus 75, and a fixing unit 76, and forms the image by an electrophotographic method. The exposure apparatus 71 forms an electrostatic latent image on the photoreceptor drum 74 based on the image data. The charging apparatus 72 uniformly charges the photoreceptor drum 74 at a predetermined electric potential. The developing device 73 supplies a toner to the photoreceptor drum 74 and develops an electrostatic latent image formed on the photoreceptor drum 74. The fixing unit 76 fixes a toner image, transferred on the sheet S, on the sheet S.

The discharge unit 108 discharges the sheet S on which the image is formed to the discharge tray 100t. The discharge tray 100t is located outside the housing 101.

Embodiment 4 has been described above. Typically, the display 211 included in the image forming apparatus 100 is small in size. In this case, it is difficult for the user to recognize whether the preview image displayed on the display 211 included in the image forming apparatus 100 corresponds to the desired image data 92 or not. According to this embodiment, when the user touches any position, the first preview image GP1 is enlarged at the magnification rate and the second preview image GP2 rotated at the rotation angle is displayed on the display 211. Accordingly, the user's visibility of the preview image can be improved.

In this embodiment, while a configuration where the display processing device 1 is located in the image forming apparatus 100 in the electrophotographic method has been describe as the example, the display processing device 1 can be located, for example, in the image forming apparatus 100 in an inkjet printing method.

The disclosure is, for example, effective in a field of a display processing device. The display processing device is, for example, effective in a field of an image forming apparatus.

Exemplary Embodiment of the Disclosure

A display processing device according to the disclosure includes a display, a touch sensor, and a control unit. The display displays a first preview image corresponding to a printing result of a character string image configured of a plurality of characters. The touch sensor outputs a signal indicative of a touched position touched by a user on the first preview image. The control unit receives the signal indicative of the touched position. The control unit executes a first detecting process, a rotation angle obtaining process, a second detecting process, and a magnification rate calculation process upon receiving the signal indicative of the touched position. The first detecting process indicates a process that detects a first character image with the touched position as an origin. The first character image indicates a character image detected first when the first preview image is analyzed with the touched position as the origin. The rotation angle obtaining process indicates a process that obtains a rotation angle at which a direction of the first character image becomes a predetermined direction when the first character image is displayed on the display. The second detecting process indicates a process that detects a heading character image indicating a heading character of the plurality of characters with the first character image as an origin. The magnification rate calculation process indicates a process that calculates a magnification rate at which a display size that indicates a size when the heading character image is displayed on the display becomes a specified size. The control unit displays the second preview image on the display. The second preview image indicates the first preview image enlarged at the magnification rate and rotated at the rotation angle.

The image forming apparatus according to the disclosure includes the display processing device, the storage device, and the image forming unit described above. The storage device stores image data indicating the character string image. The image forming unit forms an image based on the first image data.

A display processing method according to the disclosure includes the following steps. A first displaying step of displaying a first preview image corresponding to a printing result of a character string image configured of a plurality of characters on a display. A touched position detecting step of outputting a signal indicative of a touched position touched by a user on the first preview image. A first detecting step of detecting a first character image detected first when the first preview image is analyzed with the touched position as an origin. A rotation angle obtaining step of obtaining a rotation angle at which a direction of the first character image becomes a predetermined direction when the first character image is displayed on the display. A second detecting step of detecting a heading character image that indicates a heading character of the plurality of characters with the first character image as an origin. A magnification rate calculating step of calculating a magnification rate at which a display size that indicates a size when the heading character image is displayed on the display becomes a specified size. A second displaying step of enlarging the first preview image at the magnification rate and displaying the second preview image rotated at the rotation angle on the display.

A display processing program according to the disclosure causes a computer to execute the following procedures. A first display procedure that displays a first preview image corresponding to a printing result of a character string image configured of a plurality of characters on a display. A touched position detection procedure that outputs a signal indicative of a touched position touched by a user on the first preview image. A first detection procedure that detects a first character image detected first when the first preview image is analyzed with the touched position as an origin. A rotation angle obtaining procedure that obtains a rotation angle at which a direction of the first character image becomes a predetermined direction when the first character image is displayed on the display. A second detection procedure that detects a heading character image that indicates a heading character of the plurality of characters with the first character image as an origin. A magnification rate calculation procedure that calculates a magnification rate at which a display size that indicates a size when the heading character image is displayed on the display becomes a specified size. A second display procedure that enlarges the first preview image at the magnification rate and displays the second preview image rotated at the rotation angle on the display.

Effects of the Disclosure

According to the disclosure, visibility of a preview image can be improved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A display processing device comprising:
a display that displays a first preview image corresponding to a printing result of a character string image including a plurality of characters;
a touch sensor that outputs a signal indicative of a touched position touched by a user on the first preview image; and
a control unit that receives the signal indicative of the touched position,
wherein the control unit executes a first detecting process, a rotation angle obtaining process, a second detecting process, and a magnification rate calculation process upon receiving the signal indicative of the touched position,
the first detecting process indicates a process that detects a first character image with the touched position as an origin, the first character image indicating a character image detected first when the first preview image is analyzed with the touched position as the origin,
the rotation angle obtaining process indicates a process that obtains a rotation angle at which a direction of the first character image becomes a predetermined direction when the first character image is displayed on the display,
the second detecting process indicates a process that detects a heading character image indicating a heading character of the plurality of characters with the first character image as an origin,
the magnification rate calculation process indicates a process that calculates a magnification rate at which a display size that indicates a size when the heading character image is displayed on the display becomes a specified size,
the control unit displays the second preview image on the display, and
the second preview image indicates the first preview image enlarged at the magnification rate and rotated at the rotation angle.
2. The display processing device according to claim 1,
wherein the control unit detects the first character image by analyzing an image included in the first preview image along a first analysis direction with the touched position as the origin in the first detecting process,
the control unit detects the heading character image by analyzing the image included in the first preview image along a second analysis direction with the first character image as the origin in the second detecting process, and
the first analysis direction is in parallel with the second analysis direction.
3. The display processing device according to claim 1,
wherein the control unit detects the first character image by analyzing an image included in the first preview image along a first analysis direction with the touched position as the origin in the first detecting process,
the control unit detects the heading character image by analyzing the image included in the first preview image along a second analysis direction with the first character image as the origin in the second detecting process, and
the first analysis direction intersects with the second analysis direction.
4. The display processing device according to claim 3,
wherein the first analysis direction is perpendicular to the second analysis direction.

5. The display processing device according to claim 1,
wherein the control unit detects the first character image by analyzing an image included in the first preview image along a first analysis direction with the touched position as the origin in the first detecting process, the control unit detects the heading character image by analyzing the image included in the first preview image along a second analysis direction and a third analysis direction with the first character image as the origin in the second detecting process, and the second analysis direction intersects with the third analysis direction.

6. The display processing device according to claim 1, wherein the control unit obtains the rotation angle by determining whether the first character image matches a specified character image or not in the rotation angle obtaining process.

7. The display processing device according to claim 6, the control unit obtains the rotation angle by rotating the first character image by 90 degrees and determining whether the first character image matches the specified character image or not upon determining that the first character image fails to match the specified character image.

8. An image forming apparatus comprising:
the display processing device according to claim 1;
a storage device that stores image data indicating the character string image; and
an image forming unit that forms an image based on the image data.

9. A display processing method comprising:
displaying a first preview image corresponding to a printing result of a character string image including a plurality of characters on a display;
outputting a signal indicative of a touched position touched by a user on the first preview image;
detecting a first character image detected first when the first preview image is analyzed with the touched position as an origin;
obtaining a rotation angle at which the first character image is rotated such that a direction of the first character image becomes a predetermined direction when the first character image is displayed on the display;
detecting a heading character image that indicates a heading character of the plurality of characters with the first character image as an origin;
calculating a magnification rate at which a display size that indicates a size when the heading character image is displayed on the display becomes a specified size; and
enlarging the first preview image at the magnification rate and displaying the second preview image rotated at the rotation angle on the display.

10. A non-transitory computer-readable recording medium storing a display processing program, the display processing program for causing a computer to:
display a first preview image corresponding to a printing result of a character string image including a plurality of characters on a display;
output a signal indicative of a touched position touched by a user on the first preview image;
detect a first character image detected first when the first preview image is analyzed with the touched position as an origin;
obtain a rotation angle at which the first character image is rotated such that a direction of the first character image becomes a predetermined direction when the first character image is displayed on the display;
detect a heading character image that indicates a heading character of the plurality of characters with the first character image as an origin;
calculate a magnification rate at which a display size that indicates a size when the heading character image is displayed on the display becomes a specified size; and
enlarge the first preview image at the magnification rate and display the second preview image rotated at the rotation angle on the display.

\* \* \* \* \*